(12) United States Patent
Strnad et al.

(10) Patent No.: US 8,078,482 B2
(45) Date of Patent: Dec. 13, 2011

(54) METHOD FOR UNDERWRITING MULTINATIONAL INSURANCE BUSINESS IN ACCORDANCE WITH NATIONAL AND INTERNATIONAL LAWS

(75) Inventors: Martin Strnad, Zurich (CH); Mark Hetherington, Horgen (CH); Andrew Gitsham, Zollikerberg (CH); Jude Buckley, Southampton (GB); Urs Lüthy, Zurich (CH)

(73) Assignee: Zurich Insurance Company, Zurich (CH)

( * ) Notice: Subject to any disclaimer, the term of this patent is extended or adjusted under 35 U.S.C. 154(b) by 735 days.

(21) Appl. No.: 12/004,146

(22) Filed: Dec. 20, 2007

(65) Prior Publication Data

US 2008/0162194 A1   Jul. 3, 2008

Related U.S. Application Data

(60) Provisional application No. 60/876,380, filed on Dec. 21, 2006.

(51) Int. Cl.
   *G06Q 40/00* (2006.01)
(52) U.S. Cl. .............................................. 705/4; 705/19
(58) Field of Classification Search .................. 705/400, 705/26, 27, 37, 4
   See application file for complete search history.

(56) References Cited

U.S. PATENT DOCUMENTS 7,650,315 B2 * 1/2010 Wiest et al. .................... 705/400
2005/0071203 A1 * 3/2005 Maus ................................ 705/4

* cited by examiner

*Primary Examiner* — Ojo O Oyebisi
(74) *Attorney, Agent, or Firm* — DLA Piper LLP (US)

(57) ABSTRACT

A method for providing insurance, which includes steps of issuing a first insurance policy covering risk disposed in one or more different countries, determining if one or more of the countries prohibit insurance issued by foreign insurers, and subsequently issuing one or more additional insurance policies, if such insurance is prohibited. The additional insurance policies may be issued in each country, or for groups of countries.

33 Claims, 2 Drawing Sheets

METHOD FOR UNDERWRITING MULTINATIONAL INSURANCE BUSINESS IN ACCORDANCE WITH NATIONAL AND INTERNATIONAL LAWS

CROSS REFERENCE TO RELATED APPLICATIONS

This application claims priority to U.S. Provisional Patent Application No. 60/876,380, filed Dec. 21, 2006, the entire contents of which are incorporated by reference, as if fully set forth herein.

FIELD OF THE INVENTION

This present invention relates to the field of insurance, and more particularly to a method for underwriting insurance business policies across multiple states, nations or jurisdictions in accordance with international and national regulatory and tax laws.

BACKGROUND OF THE INVENTION

Many insurance companies have customers with bases of operation in more than one U.S. state, and in many cases in more than one national country. Because of the legal, regulatory and tax differences between different states, nations and jurisdictions, most insurance companies underwrite policies from a particular location, to a Policyholder (i.e., First Named Insured) in that same location. For example, an insurance company based in Pennsylvania would only underwrite insurance to Pennsylvania residents or entities. However, in some cases, insurance companies in one state, nation or jurisdiction underwrite insurance providing coverage to risk exposures pertaining to that same Policyholder (or different Policyholder) located in another state, nation or jurisdiction. Examples may be states, nations or jurisdictions, where there are registered subsidiaries of the Policyholder, or where the Policyholder has property, representative offices, registered directors and officers, etc. In such cases, the insurance companies must ensure to act in accordance with the legal, regulatory and tax requirements for such other state, nation or jurisdiction. Such business practice is also known as Cross Border (CB) or Out Of Territory (OOT) coverage. When policies number in the thousands, and states, nations and jurisdictions in the hundreds, keeping track of all the different legal, regulatory and tax requirements can be cumbersome.

Additionally, some states, nations and jurisdictions place significant restrictions on 'non-admitted' or Out Of Territory (OOT) insurance companies, and in some cases do not permit such companies to insure risks or exposures located in their territories. For example under certain conditions and at the time being, Brazil, China, Japan, the Russian Federation, Switzerland, India, Malaysia, Mexico, Turkey, Thailand and Hong Kong all place significant restrictions on OOT insurance companies, irrespective of the place, where the insurance contract is negotiated. For example, if an US-based insurer is providing insurance coverage to a customer's premises or other exposure which is physically located in Switzerland, then, the US-based insurer is not permitted to do so without obtaining the proper authorization (license) from the Swiss insurance regulator (i.e., the Swiss Federal Office of Private Insurance (FOPI)), irrespective of the fact that this insurance coverage probably is negotiated and underwritten outside of Switzerland, in the US.

Accordingly, there is presently a need for a method for underwriting insurance which allows insurance contracts to be efficiently underwritten across different states, nations and jurisdictions, and which ensures that insurers act in accordance with legal, regulatory and tax requirements across different states, nations or jurisdictions.

SUMMARY OF THE INVENTION

An exemplary embodiment of the present invention comprises a method for providing insurance, including the steps of issuing at least one first insurance policy covering at least one risk disposed in one or more geographic areas, determining if at least one of the one or more geographic areas prohibit insurance issued by an insurer which is not disposed within one of the one or more geographic areas, and issuing at least one second insurance policy if at least one of the one or more geographic areas prohibit insurance issued by an insurer which is not disposed within one of the one or more geographic areas.

Another exemplary embodiment of the present invention comprises a computer readable medium having embodied therein a computer program for processing by a machine, the computer program including a first code segment for permitting the implementation of at least one first insurance policy covering at least one risk disposed in one or more geographic areas, a second code segment for determining if at least one of the one or more geographic areas prohibits insurance issued by an insurer which is not disposed within one of the one or more geographic areas, and a third code segment for issuing at least one second insurance policy if at least one of the one or more geographic areas prohibits insurance issued by an insurer which is not disposed within one of the one or more geographic areas.

Another exemplary embodiment of the present invention comprises a computer data signal embodied in a carrier wave including a first code segment for permitting the implementation of at least one first insurance policy covering at least one risk disposed in one or more geographic areas, a second code segment for determining if at least one of the one or more geographic areas prohibits insurance issued by an insurer which is not disposed within one of the one or more geographic areas, and a third code segment for issuing at least one second insurance policy if at least one of the one or more geographic areas prohibits insurance issued by an insurer which is not disposed within one of the one or more geographic areas.

DETAILED DESCRIPTION

Figure 1:
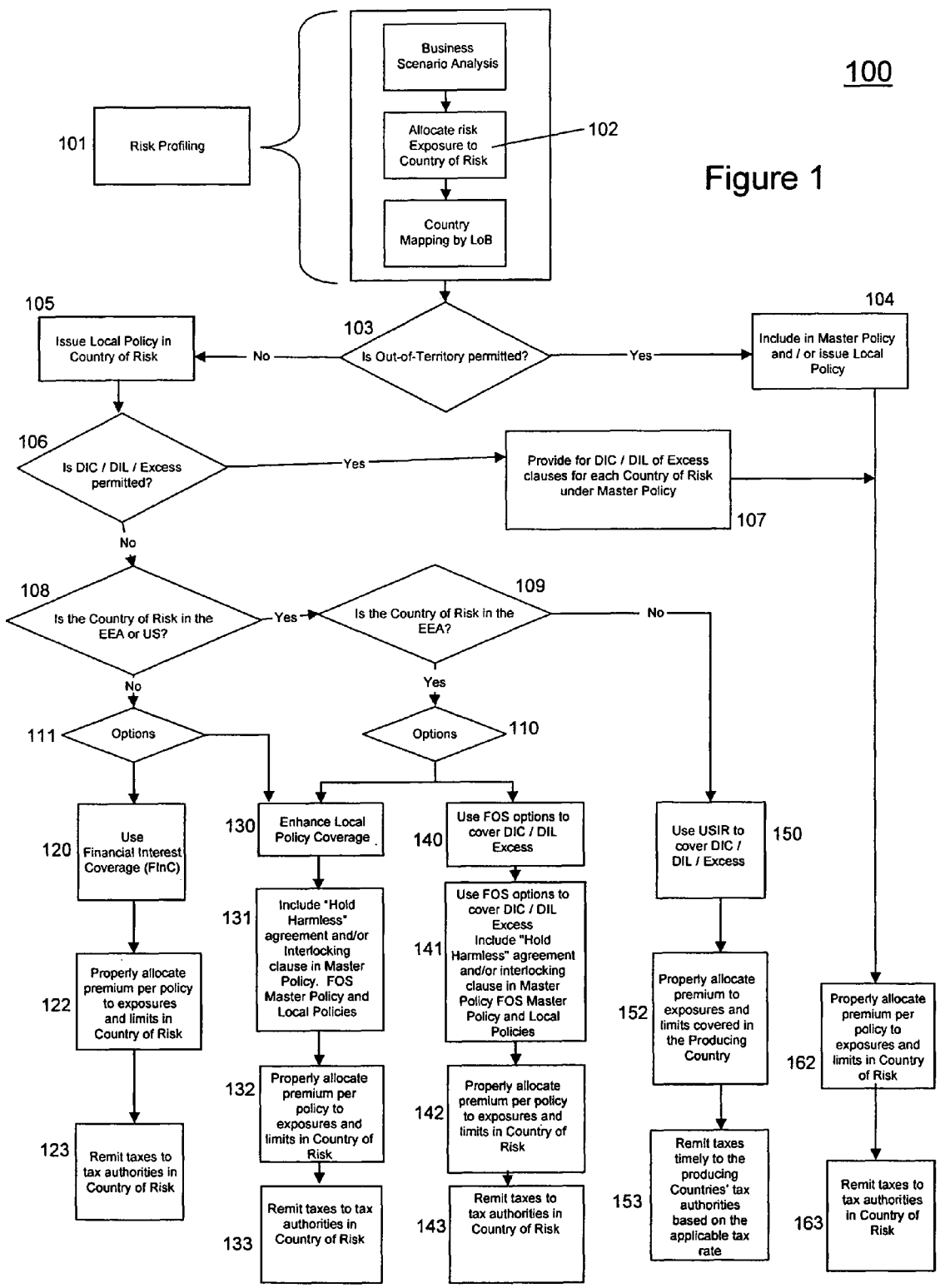
FIG. 1 is a flow chart showing a method for underwriting multinational insurance business according to a first exemplary embodiment of the invention.

The present invention comprises, in a first exemplary embodiment, a method for underwriting multinational insurance which permits the efficient, consistent and sustainable issuance and maintenance of insurance contracts providing coverage to risk exposures located in another state, nation and/or jurisdiction. The method may be applied to any layer of insurance (e.g., Primary, Difference in Conditions/Difference in Limits (DIC/DIL) and/or Excess), as well as for follow line/co-insurance policies. To be clear, the method described below does not produce the insurance agreements or policies referenced herein, it merely demonstrates and outlines to the insurance underwriter on what terms and under what conditions he or she is permitted to cover various entities or risks. It will be appreciated that the following description is intended to refer to exemplary embodiments of the present invention selected for illustration in the drawings, and such exemplary embodiments are not intended to define or limit the present invention.

The following terms are relevant to the foregoing discussion, and will be briefly explained at the outset:

Master Policy—an insurance agreement between an insurer (and possibly co-insurers) and an insured which covers the Policyholder's risks, exposures or other insurable interests in multiple states, nations or jurisdictions.

Local Policy—an insurance agreement between a local insurer (which is domiciled, registered and admitted, licensed or otherwise authorized to conduct the business of insurance in its respective country of domicile) and an insured's local subsidiary. Such a local insurer may either be a related or affiliated company of the primary insurer (i.e., the insurer of the Master Policy), or appointed thereby.

European Economic Area (EEA)—A group created by the European Union (EU) and the European Free Trade Association (EFTA), whose members include all member states of the EU and EFTA. The EEA is a coalition of European countries presently comprised of the following: Austria, Belgium, Bulgaria, Cyprus, Czech Republic, Denmark, Estonia, Finland, France, Germany, Greece, Hungary, Ireland, Italy, Latvia, Lithuania, Luxembourg, Malta, Netherlands, Poland, Portugal, Romania, Slovakia, Slovenia, Spain, Sweden, United Kingdom, Iceland, Liechtenstein and Norway.

Difference in Conditions (DIC)—a provision under a Master Policy which covers the difference in definitions, perils, conditions or coverage between any Local Policy and the Master Policy, provided that the coverage is provided for under the Master Policy.

Difference in Limits (DIL)—a provision under a Master Policy which covers the difference between the respective limit of liability stated in any Local Policy and the Master Policy, provided that the coverage is provided for under the Master Policy.

FOS Master Policy—FOS stands for Freedom of Services, which was established within the EEA in order to allow EEA registered service providers to offer and conduct their services without restrictions across the EEA. An FOS Master Policy is an insurance agreement between an EEA-licensed insurer (and possibly co-insurers) and a Policyholder which has risks, exposures and/or other insurable interests located in different countries throughout the EEA. The FOS Master Policy may be used to complement a Master Policy issued by non-EEA licensed insurer, in order to cover the risks located in these countries with one policy document or agreement, instead of issuing local insurance policies in all the EEA member countries. The FOS Master Policy provides the Policyholder with a single agreement covering risk exposures within the EEA comprehensively.

FOS Integrated Master Policy—the same as an FOS Master Policy except that in this instance, the Policyholder in addition has Local Policies in certain EEA countries which are 'integrated' with the FOS Master Policy. The FOS Integrated Master Policy provides DIC/DIL or Excess coverage in the event of any shortfall between the FOS Master Policy and any Local Policies.

Stacking—the accumulation of limits (as between Master, Local and FOS Master Policies) within the same line of business.

Primary Coverage—insurance coverage that is provided up until a certain overall limit is reached.

Excess Coverage—insurance coverage that is provided over and above Primary Coverage.

Excess Policy—an insurance agreement providing for Excess Coverage.

First Named Insured—alternative title for Policyholder.

Policyholder—a contracting party to a Master Policy. The Policyholder normally is the parent or holding company of the insured multinational customer. The Policyholder often purchases the insurance coverage for its international subsidiaries and affiliates located worldwide. The method for underwriting multinational insurance explained below permits the insurer to insure the Policyholder (and any of its subsidiaries and affiliates or other exposures like its properties, etc.) in states, jurisdictions and nations where the insurer is permitted to do so, through a Master Policy. Where the insurer is not permitted to do so, the method offers a number of alternative methods (e.g., Local Policies, FOS, Financial Interest Coverage (FInC), etc.).

FIG. 1 shows a flow chart of a method for underwriting insurance 100 for multinational customers (i.e., Policyholders) according to a first exemplary embodiment of the present invention. The method 100 includes a first step (Step 101) in which the insurer establishes a Risk Profiling template for the customer. This means that the insurer will: (i) identify one (1) of a plurality of pre-determined Business Scenarios, within which the insurance contract will be structured for the multinational customer, (ii) identify and allocate an economic estimate (in terms of money value) to the real risk exposure located in all the different countries covered under the chosen Business Scenario, and (iii) summarize these findings in a template evidencing all the insured risks by country and Line of Business (LoB). Such a template will be referred to herein as an MIP Underwriter Worksheet template (See FIG. 2). The Business Scenarios may include situations such as: (1) OOT coverage through a Master Policy issued by the insurer to the client's parent company/Policyholder, (2) DIC/DIL coverage through a Master Policy issued by the insurer to the client's parent company/Policyholder, (3) Excess coverage through a Master Policy issued by the insurer to the client's parent company/Policyholder, (4) Local Policy coverage with no local entity, and (5) Local Policy coverage with local entity, and variations thereof. Also, special solutions like agreements involving United States Insurance Regulations (USIR) and Financial Interest Coverage (FInC), as outlined further below, are part of the present method 100. Of course, those of ordinary skill in the art will realize that the above-referenced Business Scenarios are only exemplary, and any insurance coverage scenario is within the scope of the present invention.

Each LoB which will be underwritten is correlated with the particular countries in which the insurance is requested by the insured. Various LoBs are contemplated to be within the scope of the first exemplary embodiment of the present invention. For example, such LoBs may include, but are not limited to: (1) Property, (2) Marine, Aviation & Transport, (3) Liability, (4) Financial Lines, (5) Motor, (6) Accident & Health, (7) Credit, Surety & Fidelity, (8) Worker's Compensation, (9) Automobile Assistance, (10) Crop, (11) Legal Indemnity, (12) Travel and (13) Warranty. Each of the above LoBs may also optionally include various sub-categories. For example, the Property LoB may include sub-categories for (1) Material Damage, (2) Business Interruption and (3) Boiler & Machinery.

If, for example, a prospective insured requests Property and Liability coverage in France, Germany and Switzerland from an insurer based in the United Kingdom, the LoBs need to be correlated with the countries to ensure that such insurance can be underwritten. The MIP Underwriter Worksheet template may be used by the insurer to quickly identify permitted coverage on a per country basis for each LoB, and for the defined Business Scenario.

For ease of reference, countries may be identified as either 'Home' or 'Away.' 'Home' countries are those countries where the Master Policy originates (the country of the specific insurer or underwriter and of the Policyholder). 'Away' countries are those countries which are covered by the Local Policies and those sections of the Master Policy, which are providing insurance coverage into these countries on a permitted OOT basis (i.e., the country or countries of the locally insured exposure).

Countries may also be mapped into particular color groups to make the correlation process simpler. For example, the color green may correspond to: (1) Home countries (i.e. countries where the insurer has a base of operations), (2) Away countries that allow OOT coverage in general, (3) Away countries that allow at least Excess and/or DIC/DIL coverage. Similarly, the color red may correspond to: Away countries that do not permit OOT, Excess and/or DIC/DIL coverage, and the color blue may correspond to countries where additional insurance solutions are available.

This means that a state, nation or jurisdiction may initially figure as red, due to the prohibition to insure risks that are located inside such territory on an OOT basis. However, there may be supra-national treaties (e.g., treaties within the European Union) or national legal exemptions (e.g., the industrial insured exemption as endorsed in a number of US States), which allow an OOT insurer to insure risks in such "Away" territory, subject to conditions. As soon as such conditions are met, the character of a red country may turn into blue, meaning that there are alleviated methods of transacting the business of insurance in such territory. Such additional solutions which are encompassed within the scope of the present invention include: (1) FOS Master Policies, (2) FOS Master Policies, and (3) USIR (United States Insurance Rules). As discussed above, an FOS Master Policy is an insurance agreement between an EEA-licensed office of the insurer and an insured which provides insurance coverage with respect to all risks and exposures of an insured that are located within any territory pertaining to the EEA. An FOS Integrated Master Policy covers risks and exposures in the same geographical scope. The difference to the FOS Master Policy is that with the FOS Integrated Master Policy, the insurer is covering the DIC and DIL portion above any Local Policy issued within any particular EEA jurisdiction. This option is preferable, where a customer still requires heavy local servicing in any of the EEA countries. Finally, a USIR policy is an insurance agreement insuring risks based in the US, the insurance contract being agreed between a Policyholder and an insurer, both of which are based outside the US. USIR policies have significant restrictions, as discussed below, and are thus not always an available option.

As noted above, the Risk Profiling process (Step 101) is comprised of at least three (3) sub-steps of determining a Business Scenario (Step 102*a*), allocating risk on a per country basis (Step 102*b*), and mapping LoBs on a per country basis (Step 102*c*). For example, if the Master Policy covers insureds in France, Germany and Switzerland, the risk, and premium, must be allocated between these different countries. This is normally done based on an equivalent to the value of the insured risk located in such country. The premium may be allocated to the insurance of risk located in a given country that reflects the local risk characteristics, terms, conditions, limits and coverage. Preferably, the same premium allocation methodology is applied to DIC/DIL coverage provided out of the Master Policy, as well as for FOS Master Policies, and Excess Policies. Because the premium allocation determines the premium (and taxes) owed with respect to the risk and exposures insured in any given country, the underwriting must clearly reflect the methodology of the premium allocation as between countries, between Local Primary Coverage and DIC/DIL coverage provided by Master Policies per country, and between traditional insurance and Financial Interest (FInC) coverage (explained below), if necessary. As discussed above, the end result of Steps 101 and 102*a*-102*c* is preferably the generation of the MIP Underwriter Worksheet (See FIG. 2).

After Risk Profiling is complete (i.e., Steps 101, 102*a-c*), the insurer should determine if each country of risk permits OOT insurance (Step 103). For example, China in principle does not permit foreign insurance companies to write policies covering risks based in China. If the country permits OOT insurance, the method proceeds to the step of including the country of risk in a Master Policy (i.e., an insurance policy covering multiple countries, states or jurisdictions), and/or a Local Policy (i.e., and insurance policy covering a single country, state or jurisdiction) (Step 104). If the country of risk does not permit OOT insurance, the method proceeds to the step of requiring the underwriter to issue a Local Policy in the country (Step 105). In the above example, the insurer would be required to issue a Local Policy in China. Steps 103-105 are preferably repeated for each country of risk which is identified in the Risk Profiling process.

Where a Local Policy needs to be issued for a particular country of risk, the underwriter should next consider whether the country of risk permits DIC/DIL or Excess coverage (Step 106). That is, because a multitude of Local Policies will cluster the global risk of the insurer. With the DIC/DIL coverage, the indemnification limits provided under the various Local Policies can be minimized, and therefore the insurer is held to take advantage of any permissibility to insure any customer on a DIC/DIL basis, in order to free up capacity.

If the country of risk permits such DIC/DIL or Excess coverage, the method proceeds to the step of including such coverage in a Master Policy (Step 107). If the country of risk prohibits such coverage (as is the case in China), the method proceeds to the step of determining whether the country of risk is in the European Economic Area (EEA), or is the United States (US) (Step 108). It will be noted that Switzerland is not presently part of the EEA, however, should they (or any other country) become a member country of the EEA in the future, the below description would equally apply.

If the country of risk is either in the EEA, or is the US, the method proceed to the step of first determining of the country of risk is in the EEA (Step 109). If the country of risk is in the EEA, the method proceeds to the step of determining Local, DIC/DIL and Excess coverage options (Step 110). If the country of risk is not either in the EEA, or the US, the method proceeds to the step of determining alternative coverage options (Step 111). Such alternative coverage options include Local Policy enhancement, and Financial Interest Coverage (FInC).

When the country of risk is not the US, and is not in the EEA, the coverage options are Financial Interest Coverage (FInC) (Step 120) or Local Policy enhancement (Step 130). Each will be explained below.

Financial Interest Coverage (FInC) respects the above-mentioned prohibitions in the states, nations or jurisdictions, that fall in the red group (i.e., states, nations or jurisdictions where OOT, Excess and/or DIC/DIL coverage is not permitted). Under the FInC concept, it is not the individual risk located in a red country that is the subject matter of insurance. In contrast, FInC protects the insurable financial interest of the parent company of a multinational corporation (i.e., the Policyholder's financial interest). Particularly, the parent has a financial interest in safeguarding all its assets invested in its international business, and to protect itself against consequences of any losses, liabilities or other exposures in red countries. For purposes of the FInC, the financial interest can therefore be defined as the parent company's (i.e., Policyholder's) assets (e.g., property, investments, joint ventures etc.), subsidiaries (including their assets and liability exposures), as well as associated or affiliated companies, that are located or registered in any country prohibiting the conducting of insurance. For example, a parent company/Policyholder may have a main office located in Germany, and subsidiaries located in China, Brazil and the US. Assuming China and Brazil are 'red' stated (i.e., they do not permit OOT, Excess and DIC/DIL insurance coverage), the German parent (i.e., the Policyholder) can insure for losses of those subsidiaries by entering into an insurance agreement in Germany which covers financial losses the parent may sustain in Germany as a consequence. That way, if for example, the Chinese subsidiary incurs a loss based on a product liability claim, the loss will be paid by the parent (to the Chinese subsidiary), and then recouped by the parent by making a claim to the German insurance policy. In terms of contract structure, the FInC can be included as a special clause or endorsement to the Master Policy.

As noted above, FInC does not insure the actual exposure or the physical risk located in a red country, because that would be prohibited. FInC is triggered by an event occurring in a red country (e.g., product liability claim), but the insured risk will be the loss arising of such local event on the books of the parent company/Policyholder. For purposes of FInC, any actual exposure or physical risk located in a red country is treated as a 'risk person' or 'risk exposure.' A 'risk person' or 'risk exposure' can trigger an insurance event (e.g., a fire, liability, etc.), which as a consequence can result in a detriment to the defined financial interest of the parental company/policy holder back in the parental company's jurisdiction of residence (i.e., the "Home" Country). Preferably, only where a loss is actually suffered by the parent/Policyholder, will a FInC claim be paid. The FInC insurance does not, for the obvious reasons, cover the triggering 'risk person' or 'risk exposure' residing in a state, nation or jurisdiction which prohibits OOT insurance.

Local Policy enhancement is another option where country of risk is not the US, and is not in the EEA (Step 130). In many cases, depending on the characteristics of the customer's risk or exposure located in any local state, nation or jurisdiction, it may be advisable for the insurer to provide for more of the insurance coverage and services through a Local Policy (i.e., an insurance policy in the country of risk). However, where Local Policies are enhanced in terms of coverage, the overall exposure of the insurer becomes economically more interrelated and complex, and the insured sums can aggregate. For example, where there are a number of states in which the customer requires liability coverage (e.g., 50 states) for a limit of $50 Million per state, and where there are product liability claims in multiple states, the overall exposure for the insurer will multiply the number of states (e.g., 50) times the coverage limit (e.g., $50 Million), and result in a much higher total exposure for the insurer (e.g., 2.5 Billion of total exposure). Therefore, the insurer often is required to define a worldwide overall limit of indemnification (say $150 Million), and has to request a Hold Harmless Agreement from the Policyholder, stipulating that, in the event that insurance payments are made by the insurer under one or more of the Local Policies exceeding the worldwide overall limit of indemnification, which normally is agreed under the Master Policy, the Policyholder will pay the difference to the insurer (i.e., the Policyholder will indemnify the insurer for payments over the worldwide limit) (Step 131). Because the insured Policyholder may not always want to offer indemnification to the insurer, Local Policy enhancement may have some practical limitations.

The above-referenced Hold Harmless Agreement may be implemented as a stand-alone collateral agreement, or as a clause in the Master Policy, and any associated FOS, FInC and/or Local Policies. Under either scenario, the insurer may want to include an 'interlocking' clause in the Hold Harmless Agreement which serves to remind the insured that the separate policies (e.g., Master, FOS, Local, FInC) are part of an international program, and serves to clarify the interpretation of each separate policy. The Hold Harmless Agreement itself avoids the stacking of different policy limits as between Master, FOS, Local and/or FInC policies. Although the Hold Harmless Agreement cannot restrict the limits of respective Local Policies (or change deductibles in the Local Policies), it will prevent the insured from claiming an aggregation of the various policy limits.

When the country of risk is in the EEA, the coverage options are Local Policy enhancement (Step 130), as explained above, and Freedom of Service (FOS) coverage (Step 140), which will be explained below.

One coverage option (for DIC/DIL and Excess coverage) where the country of risk is in the EEA is FOS, and the insurer may choose that option (Step 140). FOS permits an insurer based in one country of the EEA, under certain insurance regulatory conditions, to underwrite and service risks in any of the other EEA countries. For example, an insurer based in Germany could write insurance policies covering risks or insureds disposed in Italy. The main requirement for underwriting FOS policies is that the insurer registered in the country where coverage will be provided, is registered in any EEA country, where he intends to cover risks (i.e., in the above example, the German insurer would need to register in Italy by the means of a pre-defined notification process with regulatory authorities). Preferably, the insurer would maintain a list of all its bases of operation and FOS registrations, so that the underwriter can easily determine whether FOS coverage for the specific country of risk is available. If it is not available, the insurer may need to consider other options, such as are explained below.

When the country of risk is the US, the only coverage option is USIR coverage (Step 150), which will be explained below.

Another coverage option (for DIC/DIL and Excess coverage) where the country of risk is the US is USIR, and the insurer may choose that option (Step 150). However, there are several restrictions on such policies. For example, the insurer may have to meet with each of the following conditions before issuing a USIR policy: (a) the insurance policy must be issued by a so-called alien (i.e., based outside the US) insurer that is not licensed to transact insurance business in the US, (b) the first-named insured on the insurance policy must be incorporated and headquartered outside the US, (c) the insurance broker (if any) must be based outside the US, (d) the insurance policy application must be forwarded and received outside the US, (e) premium invoices must be issued outside the US and the premium must be paid and collected outside the US, (f) there must be no communications between the foreign insurer and the US-based affiliates, subsidiaries, offices or operations of the first-named insured on the insurance policy, (g) there must be no risk engineering services conducted by the foreign insurer in the US, (h) there must be no loss adjustment activities conducted in the US by the foreign insurer, (i) there must be no travel to the US by representatives of the foreign insurer. Because of these various restrictions, USIR coverage may not be available in certain circumstances.

Once the insured has performed Risk Profiling (Steps 101, 102a-102c), chosen a coverage option for each country of risk (Steps 103-110, 120, 130, 140, 150), and executed any necessary Hold Harmless Agreements (Steps 131, 141), the process proceeds to the step of allocating an insurance premium on a per policy, per country and per coverage provided basis (Steps 122, 132, 142, 152, 162). In particular, this step is performed regardless of whether coverage is through FInC (Step 122), Local Policy enhancement (Step 132), FOS (Step 142), USIR (Step 152), or a Master Policy (Step 162). Once the premium has been allocated to all countries of risk, the process proceeds to the step of remitting taxes in the countries where and as they are owed (Steps 123, 133, 143, 153, 163), a process explained in more detail below. This step is performed regardless of whether coverage is through FInC (Step 123), Local Policy enhancement (Step 133), FOS (Step 143), USIR (Step 153), or a Master Policy (Step 163), but in accordance with relevant tax laws in the jurisdiction in which tax obligations are triggered by the insurance premium flow respective to the granting of insurance coverage.

In accord with the above description, the insurer may maintain a listing of the taxes due, and utilize a computer program to provide reminders to representatives of the insurer when taxes are due, so that tax payments are not missed. Such a computer program may also indicate to the insurer what means are available in any specific country to physically remit the adequate tax amount to the correct tax authority. As an example, the software may indicate to the underwriter that it is permitted to insure risks in Australia on an OOT basis. However, the insurer stipulating and providing the coverage on an OOT basis may have no account or other relationship with the competent Australian tax authority. The software could then indicate to the underwriter, what affiliates or business partners the insurer has in Australia, and how to (and where to) remit the tax funds to the appropriate authority.

As an example of the method 100, consider a situation where a Swiss parent company/Policyholder has subsidiaries or affiliates in Germany, Australia, and China, and where a Swiss insurer will provide multinational insurance for the parent company/Policyholder. Assuming OOT insurance is permitted in Australia, but not in Germany or China, the method 100 proceeds to issuing a Master Policy covering Australia (Steps 101-104). Next, Germany is addressed through a Local Policy (Step 105). Assuming Germany does not permit OOT, DIC/DIL or Excess coverage under the Master Policy, the method proceeds to the steps of issuing an FOS Master Policy or a FOS Integrated Policy (Steps 106, 108, 109, 110, 140, 141) and/or enhancing the Local Policy (Steps 106, 108, 109, 110, 130, 131) to provide Excess and/or DIC/DIL coverage, since Germany is an EEA member country. Finally, China is addressed through a Local Policy (Step 105). Assuming China does not permit OOT, DIC/DIL or Excess coverage, the method proceeds to the steps of issuing a FInC Policy (Steps 106, 108, 109, 111, 120) and/or enhancing the Local Policy (Steps 106, 108, 109, 110, 130, 131) to provide Excess and/or DIC/DIL coverage. After policies are in place for all countries, premiums are allocated (Steps 122, 132, 142, 152, and/or 162) and taxes are paid (Steps 123, 133, 143, 153, and/or 163). Those of ordinary skill will note that although the provision of additional coverage beyond the Master Policy is discussed above in the context 'issuing' additional policies, additional coverage may be provided by additional agreements or clauses in the Master Policy, or in one or more supplemental policies (e.g., Local Policy, FOS Policy, etc.). In the above example, for instance, FInC coverage may be provided in the Master Policy, or in a separately issued policy.

Figure 2:
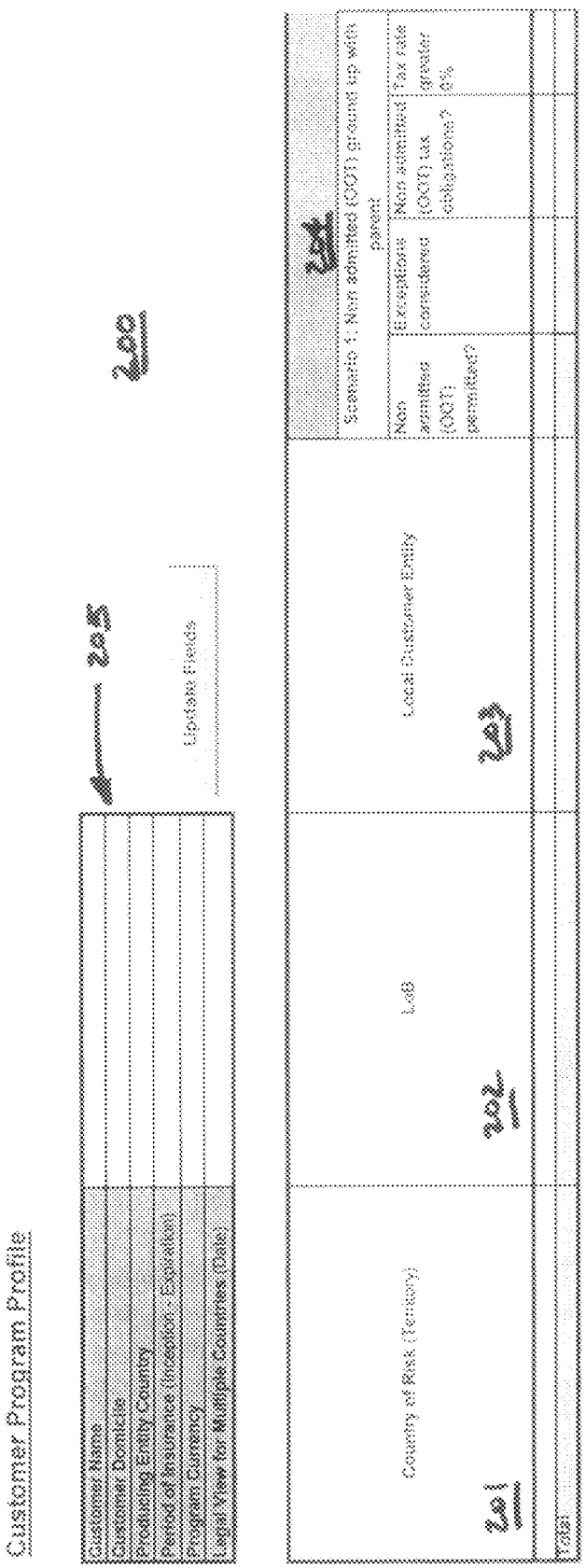
FIG. 2 shows an exemplary country mapping template according to a first exemplary embodiment of the invention.

FIG. 2 shows an exemplary MIP Underwriter Worksheet (UW) template 200 which may be utilized in performing the first step (Step 101) of the method 100 (i.e., Risk Profiling). Preferably, there is a separate MIP UW template for each LoB (e.g., Property, Liability, etc.) which includes all relevant countries of risk. The UW template includes a section for listing countries of risk 201, a section for listing LoBs 202, a section for listing a local entity 203, and a scenario section 204, which may include one or more business scenarios. In the exemplary UW template 200 shown in FIG. 2, only one scenario is shown (e.g., "Scenario 1"). The UW template 200 may also include a customer information section 205 for listing customer information such as name, address, preferred currency, etc. The UW template 200 may be implemented in paper form, or may be implemented as a form on a computer screen (generated by an associated computer program) into which information may be entered and saved.

Although the method 100 has been described above as being human-implemented methods, those of ordinary skill in the art will realize that one or more of the steps of the methods 100 may be implemented by a computer, or with the assistance of a computer. Additionally, those of ordinary skill in the art will realize that computer software may be utilized to perform one or more of the steps of the method 100.

Although the present invention has been described above in connection with a method for underwriting insurance across multiple countries, those of ordinary skill in the art will realize that the present invention is not so limited. The present invention has application where insurers and insureds are not only disposed in different countries, but also in different counties, in different states (e.g., Pennsylvania and Delaware), in different jurisdictions, and in any other geographic or legal areas or regions known to those of ordinary skill in the art.

Although the present invention has been described above in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A computer implemented method for providing insurance, comprising the steps of: implementing on a computer system at least one first insurance agreement covering at least one risk disposed in plurality of geographic areas; determining on the computer system if at least one of the plurality of geographic areas prohibit insurance issued by an insurer which is not disposed within one of the plurality of geographic areas; and implementing on the computer system at least one second insurance agreement if at least one of the plurality of geographic areas prohibit insurance issued by an insurer which is not disposed within one of the plurality of geographic areas.

2. The computer-implemented method Of claim 1, wherein the plurality of geographic areas comprise plurality of countries.

3. The computer-implemented method of claim 1, wherein the plurality of geographic areas comprise plurality of states.

4. The computer-implemented method of claim 1, wherein the plurality of geographic areas comprise plurality of legal jurisdictions.

5. The computer-implemented method of claim 1, wherein the plurality of geographic areas comprise countries.

6. A computer-implemented method for providing insurance, comprising the steps of: implementing on a computer system at least one first insurance agreement covering at least one risk disposed in one or more countries determining on the computer system if at least one of the one or more countries prohibit insurance issued by an insurer which is not disposed within one of the one or more countries; and, implementing on the computer system at least one second insurance agreement if at least one of the one or more countries prohibit insurance issued by an insurer which is not disposed within one of the one or more countries, wherein the step of implementing on a computer system at least one first insurance agreement comprises the steps of: determining a first country of risk; determining if the first country of risk permits insurance from an insurer based in a second country; and including the first country of risk on the at least one first insurance agreement, if the first country: of risk permits insurance from an insurer based in the second country.

7. The computer-implemented method of claim 6, comprising the further steps of: allocating on the computer system an insurance premium for the at least one first insurance agreement based on the first country of risk; and, remitting taxes via the computer system to the first country of risk.

8. The computer-implemented method of claim 2, wherein the step of implementing on a computer system at least one first insurance agreement comprises the steps of: determining a first country of risk; determining if the first country of risk permits insurance from an insurer based in a second country; and including the first country of risk on the at least one second insurance agreement, if the first country of risk does not permit insurance from an insurer based in the second country.

9. The computer-implemented method of claim 8, comprising the further steps of: determining on the computer system if the first country of risk is the United States or is in the European Economic Area; and, implementing on the computer system at least one third insurance agreement covering the first country of risk, if the first country of risk is either the United States or is in the European Economic Area.

10. The Computer-implemented method of claim 1, wherein the at least one first insurance, agreement comprises at least one master agreement covering at least one risk disposed in plurality of countries.

11. The computer-implemented method of claim 1, wherein the at least one second insurance agreement comprises at least one local insurance agreement covering at least one risk disposed in at least one of the plurality of geographic areas.

12. The computer-implemented method of claim 1, wherein the at least one second insurance agreement comprises at least one Freedom of Services (FOS) policy.

13. The computer-implemented method of claim 1, wherein the at least one second insurance agreement comprises at least one Financial Interest Coverage (FInC) policy.

14. The Computer-implemented method of claim 9, wherein the at least one third insurance agreement comprises at least one Freedom of Services (FOS) policy.

15. The computer-implemented method of claim 9, wherein the at least one third insurance agreement comprises at least one policy issued under United States Insurance Regulations (USIR).

16. The computer: implemented method of claim 1, comprising the further steps of: performing risk profiling on the computer system; and, entering data relating to the risk profiling into at least one worksheet on the computer system.

17. The computer-implemented method of claim 16, wherein the at least one worksheet includes a section for listing plurality of countries of risk, a Section for listing one or more lines of business, and a section for listing one or more business scenarios.

18. A computer readable medium having embodied therein a computer program for processing by a machine, the computer program comprising: a first code segment for permitting the implementation of at least one first insurance agreement covering at least one risk disposed in plurality of geographic areas; a second code segment for determining if at least one of the plurality of geographic areas prohibits insurance issued by an insurer which is not disposed within one of the plurality of geographic areas; and, a third code segment for implementing at least one second insurance agreement if at least one of the plurality of geographic areas prohibits insurance issued by an insurer which is not disposed within one of the plurality of geographic areas.

19. The computer readable medium of claim 18, wherein the plurality of geographic areas comprise plurality of countries.

20. The computer readable medium of claim 18, wherein the plurality of geographic areas comprise plurality of states.

21. The computer readable medium of claim 18, wherein the plurality of geographic areas comprise plurality of legal jurisdictions.

22. A computer readable medium having embodied therein a computer program for processing by a machine, the computer program comprising: a first code segment for permitting the implementation of at least one first insurance agreement covering at least one risk disposed in one or more countries;
 a second code segment for determining if at least one of the one or more countries prohibits insurance issued by an insurer which is not disposed within one of the one or more countries; and, a third code segment for implementing at least One second insurance agreement if at least one of the one or more countries prohibits insurance issued by an insurer which is: not disposed within one of the one or more countries, wherein the first code Segment includes code for determining a first country of risk; determining if the first country of risk permits insurance from an insurer based in a second country; and, including the first country of risk on the at least one first insurance agreement, if the first country of risk permits insurance from an insurer based in the second country.

23. The computer readable medium of claim 18, the computer program further comprising: a fourth code segment for permitting the allocation of an insurance premium for the at least one first insurance agreement based on the first country of risk; and a fifth code segment for permitting and remitting taxes to the first country of risk.

24. The computer readable medium of claim 19, wherein the first code segment includes code for: determining a first country of risk; determining if the first country of risk permits insurance from an insurer based in a second country; and, including the first country of risk on the at least one second insurance agreement, if the first country of risk permits insurance from an insurer based in the second country.

25. The computer readable medium of claim 19, the computer program further comprising: a fourth code segment for determining if the first country of risk is the United States or is in the European Economic Area; and, a fifth code segment for implementing at least one third insurance agreement covering the first country of risk, if the first Country of risk is either the United States or is in the European Economic Area.

26. The computer readable medium of claim 18, wherein the at least one first insurance agreement comprises at least one master agreement covering at least one risk disposed in plurality of countries.

27. The computer readable medium of claim 18, wherein the at least one second insurance agreement comprises at least one local insurance agreement covering at least one risk disposed in at least one of the plurality of geographic areas.

28. The computer readable medium of claim 18, wherein the at least one second insurance agreement comprises at least one Freedom of Services (FOS) policy.

29. The computer readable medium of claim 18, wherein the at least one second insurance agreement comprises at least one Financial Interest Coverage (FInC) policy.

30. The computer readable medium of claim 25, wherein the at least one third insurance agreement comprises at least one Freedom of Services (FOS) policy.

31. The computer readable medium of claim 25, wherein the at least one third insurance agreement comprises at least one policy issued under United States Insurance Regulations (USIR).

32. The computer readable medium of claim 18, the computer program further comprising a fourth code Segment for permitting the risk profiling; and a fifth code segment for permitting the entry of data relating to the risk profiling into at least one worksheet.

33. The computer readable medium of claim 32, wherein the at least one worksheet includes a section for listing plurality of countries of risk, a section for listing one or more lines of business, and a section for listing one or more business scenarios.

* * * * *